INVENTOR.
Rodney E. Grantham
BY
ATTORNEY

United States Patent Office 3,417,344
Patented Dec. 17, 1968

3,417,344
LASER EMPLOYING A LIQUID SOLUTION OF CHROME ALUMINUM
Rodney E. Grantham, Bethesda, Md., assignor to the United States of America as represented by the Secretary of the Navy
Filed Aug. 14, 1963, Ser. No. 302,217
1 Claim. (Cl. 331—94.5)

ABSTRACT OF THE DISCLOSURE

A laser wherein the active material is a liquid solution (such as chrome alum in water) containing laserable ions. By utilizing this liquid active material and circulating it through a cooling system during continuous operation, heating of the active material is controlled, thereby resulting in higher repetition rates of pulsing and higher output power.

Figure 1:
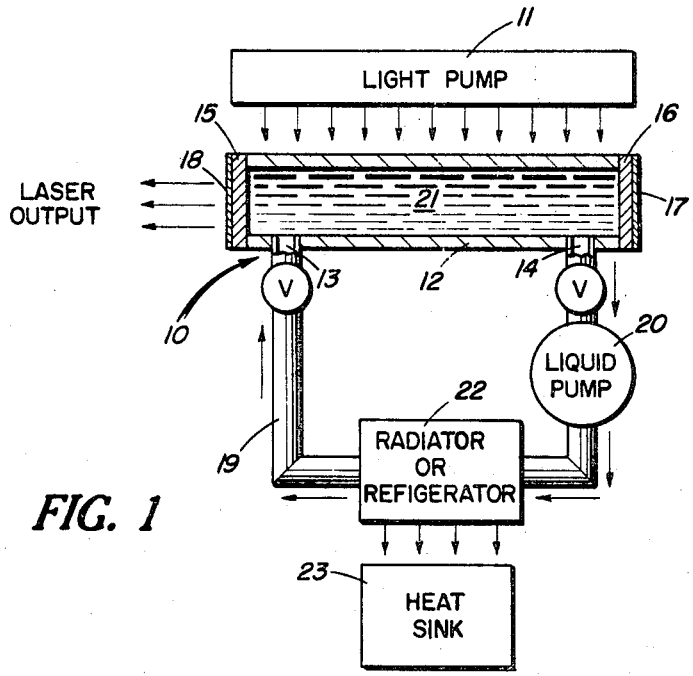

The invention described herein may be manufactured and used by or for the Government of the United States of America for governmental purposes without the payment of any royalties thereon or therefor.

The present invention relates to light amplification by stimulated emission of radiation, commonly referred to as laser operation, and more particularly to a laser wherein the emission of the stimulated radiation is derived from a liquid active material.

In the field of lasers, it has been the general practice to employ active materials such as ruby crystals, semiconductors, and ionized gases whereby the energy of the atoms and molecules therein is caused to be raised to a higher energy level than they occupy in the normal state. Although such laser devices have served the purpose, they have not proved entirely satisfactory under all conditions of service for the reason that considerable difficulty has been experienced in achieving a high repetitive rate of laser operation. Lasers having active materials fabricated from crystalline solids and glasses have been constructed and are in operation. These laser devices utilize forced air or cool nitrogen gas which is caused to circulate around the active material and conduct away the heat dissipated thereby.

In the case of those lasers having active materials fabricated from crystalline solids, the prime difficulty is in growing crystals of any appreciable size. This limitation, along with the intricate fabrication of these active material crystals, severely restricts the output power capability of this type of laser. Glass active materials on the other hand can be made quite large, but it is an expensive and tedious process to build such large glass sections having the correct composition and purity for desired laser operation. Furthermore, cooling by forced air or other circulating gases is highly inefficient thereby rendering the repetition rate of pulsed lasers very low and restricting the CW power of such devices.

The general purpose of this invention is to provide a liquid laser which embraces all the advantages of similarly employed lasers and possesses none of the aforedescribed disadvantages. The present invention achieves this purpose by utilizing a liquid active material which may be circulated and cooled during the operation of the laser. This liquid active material takes the form of a liquid solution having in it active ions or molecules capable of being pumped and stimulated to emit the monochromatic radiation desirable in laser operation.

An object of the present invention is the provision of a liquid laser for obtaining a high repetitive rate of pulsed laser operation.

Another object is to provide a liquid laser in which the stimulated emission of radiation occurs from the pumping and relaxation of active ions or molecules present in a liquid active material of said laser.

A further object of the invention is the provision of a liquid laser having an active material which may be circulated through a cooling system to permit high repetitive rate pulsing of the laser device.

Still another object is to provide a highly efficient laser having an effective cooling system for the active material therein and utilizing inexpensive liquid active materials.

A still further object of the present invention is the provision of a liquid laser which may be fabricated in heretofore unobtainable shapes and sizes.

Figure 2:
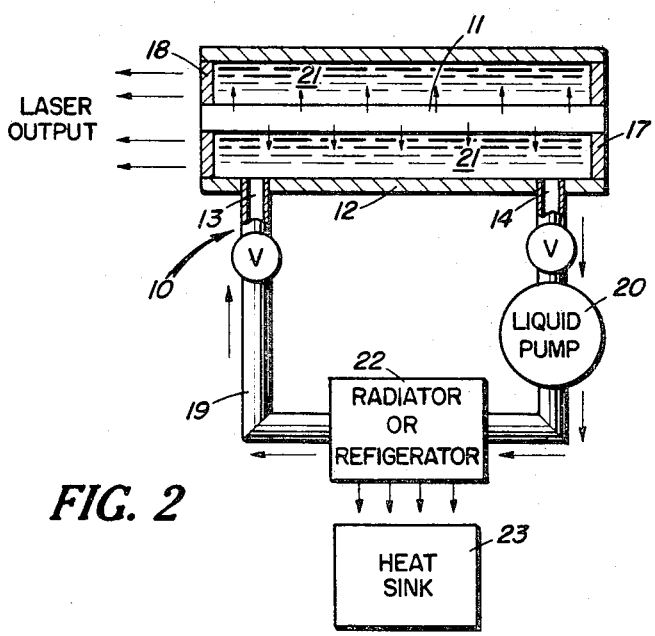

Other objects and many attendant advantages of this invention will be readily appreciated as the same becomes better understood by reference to the following detailed description when considered in connection with the accompanying drawings in which like reference numerals have been made to designate like parts throughout the figures thereof and wherein:

FIG. 1 is a diagrammatic representation of the components of the liquid laser showing the interrelationship thereof; and FIG. 2 is a diagrammatic cross-sectional representation of a second and more efficient embodiment of the liquid laser wherein the pumping means is completely surrounded by the liquid active material housing.

Referring now to the drawings, wherein like reference characters designate like or corresponding parts throughout the several views, there is shown in FIG. 1, which illustrates a first embodiment of the liquid laser, a liquid laser 10 which is illustrative of the present invention. The limiting factor on the pulse repetition rate of prior art laser devices has been the adverse effect which heating has on such devices. In order to obtain the desired condition for operation of a laser, there must exist a population inversion of the energy levels of the active material atoms. This population inversion is brought about by pumping the atoms of the active material from their normal energy state to one in which orbiting electrons occupy a higher energy level. If the active material is characterized by having three energy levels, the atoms are pumped from the lowest energy level to the third or highest energy level. This is accomplished by the atoms absorbing a certain amount of energy from an external source such as a light pump or a pumping laser which causes the electrons or molecules to occupy a higher energy state.

In the case of a crystalline solid active material such as a ruby crystal, only that energy emitted by the light pump or pumping laser in the ultraviolet and green frequency spectrum is absorbed by the crystal atoms and is useful in the pumping process of these atoms. The remaining energy falling outside of these two given frequency spectrums is dissipated in the form of heat. Furthermore, when the atoms of the crystal relax from the third energy level to the second or intermediate energy level, non-radiative decay occurs which also takes the form of heat dissipation in the active material. These two types of heat dissipation are cumulative and in the conventional laser devices causes those atoms occupying the ground or lowest energy level to acquire higher energy levels thereby saturating the active material.

Saturation by heating, therefore, results in raising the ground energy level to the point where it is difficult to pump more atoms to a higher energy level. This state of saturation is brought about essentially by the heat dissipation and, unless overcome, severely limits the pulse repetition rate of the laser.

The illustrative embodiment of the present invention shown in FIG. 1 alleviates the aforescribed heating problems occuring in conventional lasers by employing a liquid active material which may be circulated through a cooling system. The light pump 11 of liquid laser 10 provides a source of light pumping energy which is used to pump the active material. This light pump 11 may take the form of a xenon flash lamp or a crystalline type pumping laser which is controlled by an external circuit (not shown). Glass housing 12 is positioned in close proximity to the light pump 11 and is transparent to the energy emitted thereby. This glass housing 12 may take any convenient physical shape, the preferred configuration being that of an elongated cylinder having apertures 13 and 14 positioned in the side wall near the respective end walls 15 and 16 of the housing. Attached to end wall 16 is a reflective coating 17 which is similar to the reflective coatings positioned on the end of conventional ruby lasers. Reflective coating 17 is totally reflective, i.e., it reflects all of the light energy impinging upon it parallel to the axis of glass housing 12. Reflective coating 18; however, is partially reflective in that it reflects a portion of the light energy impinging upon it in a direction parallel to the axis of glass housing 12 while permitting the remainder of the light energy impinging upon it to pass through thereby providing the coherent output energy of the laser. These reflective coatings may be constructed of silver, gold, aluminum, or may take the form of interference filters made up of multiple dielectric coatings all of which are conventional light energy reflectors. Furthermore, they may be attached to the end walls of glass housing 12 either on the inside or outside provided they are mounted so as to be optically parallel to one another within a few seconds of arc. The end walls 15 and 16 may be constructed from glass or if the liquid laser is operated in the infrared spectrum, sapphire may be used.

A circulation conduit 19, which may be constructed of any material which is chemically inert when exposed to the liquid active material 21 contained by the conduit and glass housing 12. Conduit 19 is attached to glass housing 12 at aperture 14. Circulation conduit 19 transports the liquid active material 21 to conventional liquid pump 20 which maintains the circulation of the liquid active material 21 by forcing it along circulation conduit 19 to radiator 22 and then back to the chamber of glass housing 12. Circulation conduit 19, therefore, also connects liquid pump 20 with radiator 22, and in like manner, radiator 21 is connected via circulation conduit 19 to aperture 13 of glass housing 12.

Radiator 22 takes the form of a conventional refrigerant system wherein the liquid flowing therein is introduced in its heated state, cooled by the refrigerant system, and then returned in a cooled state to be used again in the continuous circulation process. Heat sink 23 is positioned in close proximity to radiator 22 to conduct away the heat removed from the liquid active material by radiator 22.

The liquid active material 21 contains ions or molecules in solution which are capable of being pumped and stimulated in a manner similar to the pumping and stimulating of the atoms in conventional laser crystals. Examples of such active ions include chromium, neodymium, samarium, uranium, and other such rare earth elements. Organic compounds such as benzene, deuterated benzene, nitrobenzene, cyclohexane, or pyridine can also be used to provide the active ions. Various solvents can be used for suspending the ions provided they maintain ionization of the active ions and the resulting solution is transparent to the light pump wavelength and the laser output wavelength. For example, a saturated solution of chrome alum and water will provide active ions which are capable of laser operation, the optimum laser operation occurring at somewhat less than saturation, Water has proven to be an advantageous selection for the solvent in that it has an index of refraction at zero degrees centigrade (0° C.) which is substantially constant and does not change appreciably for incremental changes of water temperature.

In operation the light pump is activated to provide a source of light pumping energy which is capable of pumping the atoms to higher energy levels. The desired condition for laser operation occurs when a minimum population inversion exists between this higher energy level and the ground or normal energy level of the atoms. Relaxation then occurs wherein the normal population distribution among energy levels begins to be restored resulting in the emission of energy which is radiated in accordance with Planck's law, i.e.

$$\nu = \frac{E_h - E_L}{h}$$

where $h$ is Planck's constant, $\nu$ is the frequency of the radiated energy, $E_h$ is the higher energy level, and $E_L$ is the lower energy level. The relaxation process which occurs radiates energy in all directions. That energy which is radiated parallel to the axis of the glass housing 12 is then reflected back and forth between the reflective coating 17 and the partially reflective coating 18. This process results in further pumping and stimulated emission of energy from the ions in the liquid active material thereby resulting in an avalanche of emitted coherent radiation.

By continuously circulating the liquid active material 21 by means of circulation conduit 19 and liquid pump 20, efficient and effective cooling is achieved at radiator 22 thereby permitting higher pulse repetition rate operation and higher power in CW operation. Furthermore, the use of a liquid as the atcive material medium for a laser provides a means of fabricating a relatively inexpensive laser and provides design flexibility in the physical configuration device, as may be seen from FIG. 2. FIG. 2 shows a second laser embodiment similar in operation to that of FIG. 1 but a structural modification thereof wherein the light pump 11 is positioned such that it is surrounded by the liquid active material 21. This physical configuration of the laser provides a highly efficient device in that all of the light energy emitted from the light pump must pass through the liquid active material 21 without the need for reflectors, and the like, for directing the light energy to the active material. Furthermore, the physical size of such lasers, which is an important consideration in providing a laser output of sufficiently high power to be used as a destructive weapon, is not a limitation where the active material is in a liquid form as compared to the limitations on size where the active material is a grown crystal.

Thus it may be seen that the principle of utilizing a liquid active material in a laser rather than a crystalline or glass material and a radiator and circulation system for cooling the liquid active material can be employed to provide laser operation at pulse repetition rates and CW output levels which were heretofore unobtainable.

What is claimed is:
1. A laser comprising:
   a xenon flash lamp for providing light energy sufficient to pump ions to an unstable energy level,
   a transparent glass container in the form of an elongated cylinder with closed ends and defining an active material cavity located in close proximity to said flash lamp,
   said glass container having two apertures therein located respectively along said container at opposite ends thereof defining respective passageways communicating with said active material cavity,
   reflective light energy means mounted on the ends of said glass container so as to be optically parallel within a predetermined arc with respect to one another,
   a saturated solution of chrome alum in water capable of sustaining laser operation housed in said glass con- tainer for emitting radiation upon being pumped by said xenon flash lamp, a liquid pump connected to said two apertures for pumping said saturated solution into and out of said active material cavity, and refrigerating means sealedly connected to said liquid pump for cooling said saturated solution whereby said saturated solution may be circulated and cooled to provide sustained high pulse repetition operation of said laser.

References Cited

UNITED STATES PATENTS

| | | | |
|---|---|---|---|
| 3,102,920 | 9/1963 | Sirons | 331—94.5 |
| 3,222,615 | 12/1965 | Holly | 331—94.5 |
| 3,225,307 | 12/1965 | Weissman | 331—94.5 |
| 3,349,339 | 10/1967 | Thorington | 331—94.5 |
| 3,353,115 | 11/1967 | Maimon | 331—94.5 |

FOREIGN PATENTS 1,345,477  10/1963  France.

OTHER REFERENCES

Edgerton: "A New Laser Tube," Solid State Design, November, 1962, pp. 10–11.

JEWELL H. PEDERSEN, *Primary Examiner.*

E. S. BAUER, *Assistant Examiner.*

U.S. Cl. X.R.

252—301.4